United States Patent [19]
Lane et al.

[11] Patent Number: 5,755,988
[45] Date of Patent: May 26, 1998

[54] DIBASIC ACID BASED PHASE CHANGE MATERIAL COMPOSITIONS

[75] Inventors: George A. Lane, Midland; Avery N. Goldstein, Oak Park, both of Mich.

[73] Assignee: The Dow Chemical Company, Midland, Mich.

[21] Appl. No.: 702,821

[22] Filed: Aug. 23, 1996

[51] Int. Cl.$^6$ ........................................ C09K 5/06
[52] U.S. Cl. .................... 252/70; 126/619; 165/104.21
[58] Field of Search .................. 126/619; 252/70; 165/104.17, 104.21

[56] References Cited

U.S. PATENT DOCUMENTS

| | | | |
|---|---|---|---|
| 4,100,091 | 7/1978 | Powell | 252/70 |
| 4,400,287 | 8/1983 | Kimura et al. | 252/70 |
| 4,412,930 | 11/1983 | Koike et al. | 252/70 |
| 4,448,702 | 5/1984 | Kaes | 252/70 |
| 4,532,917 | 8/1985 | Taff et al. | 126/430 |
| 4,537,695 | 8/1985 | Hawe et al. | 252/70 |
| 4,572,159 | 2/1986 | Sodergren et al. | 126/415 |
| 4,572,864 | 2/1986 | Benson et al. | 428/305.5 |
| 4,717,494 | 1/1988 | Itatani et al. | 252/70 |
| 5,456,852 | 10/1995 | Isiguro | 252/70 |

*Primary Examiner*—Gary P. Straub

[57] ABSTRACT

A process for moderating the thermal energy content of a body with a container enclosing a phase change material (PCM) is detailed. The phase change material comprises a high molecular weight dibasic organic acid and mixtures thereof. Miscible aliphatic and aryl monobasic acids are also suitable as PCM constituents. The PCM is capable of absorbing thermal energy from a variety of bodies including air, heat transfer fluids, combustion reactions, radiation sources and the like. In the course of absorbing thermal energy the PCM undergoes a reversible melt. Upon the PCM being exposed to a temperature below its melting temperature, the PCM releases the stored latent heat of fusion energy absorbed upon melting and undergoes a reversible freeze.

26 Claims, No Drawings

DIBASIC ACID BASED PHASE CHANGE MATERIAL COMPOSITIONS

FIELD OF THE INVENTION

The invention relates to phase change material compositions based on dibasic organic acids.

BACKGROUND OF THE INVENTION

There is often a need to maintain a system in a constant temperature environment without the use of an active thermal regulation apparatus. Mobile systems such as automotive preheaters, heaters for electric vehicles, avionics thermal controls, food carts, and the like where weight and durability are important factors are prime cases for the use of passive thermal regulation. For the purposes of this invention, a material that changes in heat content upon undergoing a reversible phase transformation is defined as a phase change material (PCM). The overall efficiency of a system or process is enhanced by using a PCM to convert otherwise wasted thermal energy into a harnessable heat sink.

PCMs, synonymously known as latent thermal energy storage materials, are used for thermal energy storage. In practice, PCMs with desirable liquid-solid transformation properties are employed due to the ease of containing condensed phase materials. The absorption of the necessary quantity of energy by the solid PCM results in melting. The energy absorbed by the PCM to change phase at its characteristic melting temperature is known as the latent heat of fusion. The latent heat of fusion stored in the liquid state is released upon resolidification.

The thermal profile associated with discharging a PCM consists of a decrease in temperature as the liquid PCM releases sensible heat until reaching its melting temperature; followed by a thermal plateau which is maintained until all the material is solidified, at which point the solidified PCM has released its latent heat of fusion and thereafter sensible heat release from the solid follows until equilibrium at ambient temperature is attained. Sensible heat is defined as the thermal energy absorbed or released by a material through a change in temperature, but without undergoing a phase transformation. Sensible heat storage typically requires far larger quantities of material than PCMs to store a given quantity of thermal energy in the temperature range encompassing Tm. In addition, sensible heat storage materials do not maintain a thermal plateau associated with the co-existence of both solid and liquid in a PCM during phase transformation.

Efficient PCMs generally share several common thermochemical properties including high latent heat of fusion, high thermal conductivity and the ability to cycle thermally without degradation. Often it is the case that a material will meet the aforementioned criteria and not be usable due to supercooling. A significant amount of PCM research, especially that pertaining to salt hydrates, is devoted to finding nucleating agents that will suppress supercooling. Further reduction in the number of viable PCMs occurs when one considers the additional criteria of melting temperature, density, packaging, toxicity and cost. The net result of these limitations is that there are few satisfactory PCM systems composed of only a single chemical compound or element.

Applications for PCMs are dependent on the melting temperature. Stationary applications include solar energy collection, industrial waste heat collection, preheaters for peak power generation, and domestic thermal regulation. PCMs afford considerable advantages in mobile systems where periodic temperature maintenance is required. Automotive preheaters, heaters for electric vehicles, avionics thermal controls, and food warmers are representative of mobile system applications for PCMs. A more extensive discussion of PCM applications is included in "Solar Heat Storage Latent Heat Materials", George A. Lane, editor, CRC Press, Vol. I.(1983) and Vol. II (1986); which are incorporated herein by reference.

Hydrate-based PCMs, polyols and hydrophilic organics all tend to absorb water from the surroundings depending on the ambient relative humidity, thereby changing in composition and melting properties, if exposed to the atmosphere. This presents packaging and formulation difficulties. During processing of the PCM, care must be taken to assure that the material is not in contact with excessively humid or inordinately dry air long enough to change the water content substantially. Containment of such systems over an acceptable service lifetime is a challenging problem. The container must be hermetically sealed, and of very low permeability to water vapor. In this regard, metal containers are usually satisfactory, provided the PCM does not corrode the container. Plastic containers must be thick-walled enough that water vapor transport through the container wall is negligible over the life of the heat storage system. As a result, the cost of packaging a PCM is often several times that of the material itself.

SUMMARY OF THE INVENTION

This invention is a process for reversibly controlling the temperature of a body comprising the step of: contacting said body with a closed container enclosing a phase change material comprising a high molecular weight dibasic acid, whereby the temperature of said body is controlled within a predetermined temperature range. The phase change material absorbs thermal energy from said body at a higher temperature than the phase change material, until the phase change material undergoes a reversible melt. The molten phase change material transfers thermal energy to a second body and thereby undergoes a reversible freeze. Other dibasic acids, miscible monobasic acids are optionally added to the phase change material.

The mixtures of acids have several advantages which make them particularly useful as PCMs. They melt without significant phase segregation, and may be formulated over a broad range of melting temperatures. The higher molecular weight dibasic and monobasic acids are characterized by being largely non-hygroscopic and having sufficiently low pKa values so as to not induce attack on the common packaging substrate. Thus, another advantage of the invention is less stringent packaging and encapsulation requirements relative to the salt hydrate and polyol PCMs.

DETAILED DESCRIPTION OF THE INVENTION

The properties of the higher molecular weight dibasic acids are exploited in the current invention. The higher molecular weight dibasic acids are hereby defined to include those saturated acids containing 5 or more carbon atoms, or unsaturated acids containing 4 or more carbon atoms.

Although it is not intended to limit the invention to any theory, hydrogen bonding is thought to lead to the formation of adducts. The low stability of adduct species is evidenced in the phase diagram of systems forming adducts by the gradual curvature of the liquidus away from the dystectic. The dystectic is bounded on either side by a eutectic. The low stability adduct creates a dystetic which gradually slopes toward adjacent eutectics creating a broad compositional range in which a commercial PCM can be formulated. An improved feature of the class of PCMs described herein is a broad range of formulations yielding systems with commercially acceptable thermal properties.

The well defined intermolecular orientations required for hydrogen bonding induce the formation of ordered domains, thereby facilitating crystallization. Since an ordered domain may serve as a nucleation site, supercooling is less likely to occur. An improved feature of the class of PCMs described herein over the prior art is that additives which serve as nucleating agents often are not required. A nucleating agent is defined herein as a material added to a PCM to facilitate crystal nucleation, in order to diminish supercooling.

Table 1 contains examples of the dibasic acids which are useful in this invention.

TABLE 1

Dibasic Acids for Phase Change Materials.

| Acid Name | Formula | Tm (°C.) | Density (kg.m3) |
|---|---|---|---|
| Glutaric | $(CH_2)_3(COOH)_2$ | 98 | 1.424 |
| Adipic | $(CH_2)_4(COOH)_2$ | 151 | 1.360 |
| Pimelic | $(CH_2)_5(COOH)_2$ | 105 | 1.329 |
| Suberic | $(CH_2)_6(COOH)_2$ | 144 | |
| Azelaic | $(CH_2)_7(COOH)_2$ | 106 | 1.225 |
| Sebacic | $(CH_2)_8(COOH)_2$ | 134 | 1.271 |
| Undecanedioic | $(CH_2)_9(COOH)_2$ | 106 | |
| Maleic | cis-HOOCCH=CHCOOH | 131 | 1.590 |
| Fumaric | trans-HOOCCH=CHCOOH | 302 | 1.635 |
| Phthalic | $1,2-C_6H_4(COOH)_2$ | 231 | 1.593 |
| Isophthalic | $1,3-C_6H_4(COOH)_2$ | 349 | |

The acids listed in Table 1 may be placed in a container alone or as mixtures to form PCMs. The acid mixtures are required to form a homogeneous liquid solution upon stirring over the operating temperature range of the liquid phase of the PCM.

Many monobasic acids are miscible with the dibasic acids over a wide range of compositions. Monobasic acids may be added to dibasic acid PCMs containing a dibasic acid from Table 1 or mixtures thereof. The linear aliphatic monobasic acids containing eight or more carbon atoms are largely insoluble in water and are weak acids, which make their encapsulation requirements for use in PCMs less stringent than those for prior art salt hydrate and polyol PCMs. The aryl carboxylic acids are generally operative in the invention, the exception being those functionalized aryl acids which are capable of reacting with other PCM constituents. Examples of reactive aryl acids include strong oxidizers and reactive alcohols.

Monobasic acids which are functional in the invention include:

i.) aliphatics of the form R-COOH, where R=alkyl or alkenyl, either containing more than seven carbon atoms or cyclohexyl, ii.) substituted phenyl compounds of the form

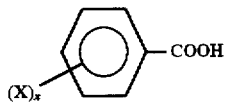

where Y=H, benzoyl-, benzyl-, alkyl containing less than 5 carbon atoms chloro-, amino-, hydroxy-, methoxy-, ethoxy-, propoxy-, ispropoxy-, butoxy-, and x is a integer number between one and five inclusive; and iii.) alpha-naphthoic and beta-naphthoic acids.

The melting temperature of a mixture of acids, as described herein is less than that for the highest melting temperature dibasic acid within the PCM. By adjusting the relative amounts of various components within a mixture, a thermal profile upon melting may be obtained which is adjustable to a predetermined value. In order to appreciate one of the principal benefits of PCMs, namely the maintenance of uniform temperature while both solid and liquid PCM is present, it is advantageous to formulate the PCM composition so that it is at or near a eutectic in the phase diagram of the PCM. It is a characteristic of many of the acid mixtures within the scope of this invention that the PCM components combine to form weakly bound compounds, which appear in the PCM phase diagram as a dystectic. The dystectic is bracketed by eutectic compositions, resulting in several compositions of a given acid mixture having thermal plateaus in their melting-freezing profiles. For example, the dibasic acid, pimelic acid forms a dystectic with the monobasic acid, palmitic acid at 75 weight percent of the total weight of pimelic acid. The melting temperatures of pure pimelic and palmitic acids are 105° and 63° C., respectively. Eutectics are observed at about 70 and 80 weight percent of the total weight of pimelic acid. Both of these eutectics have a melting temperature of about 97° C. Melting-freezing profiles having constant temperature plateaus are obtained even by varying the weight percentages several percent from those of the eutectics. While the eutectics of this example are at about the same temperature often it is not the case, thereby offering greater opportunities to adjust the melting temperature of the PCM mixture through the addition of other components. Having multiple compositions with the same melting temperature affords the advantage of choosing the composition that has the highest latent heat of fusion energy density and or lowest cost.

Upon testing various compositions of acids until a composition is found with the desired melting-freezing properties, the dibasic acid, acids or combination thereof with a monobasic acid is placed in a container. The PCM components are placed within a container, usually in the form a powder and heated to form a homogeneous liquid solution by methods well known in the art. The homogenized PCM liquid solution is then allowed to solidify.

The solid PCM within a container is then exposed to a thermal body sufficient to melt the PCM composition. The thermal body may be: a source of waste thermal energy such as a combustion exhaust stream, cooling fluid effluent or the like; a source of passive energy such as solar energy; or an active source of thermal energy such as a resistively heated element or microwave energy. The solid PCM absorbs energy first to raise the solid to its melting temperature, then an amount of energy equivalent to its latent heat of fusion in melting and lastly, additional sensible heat as the temperature of the now liquid PCM increases above the melting temperature. The PCM maintains a near uniform temperature while solid and liquid co-exist. The uniform temperature over this range of thermal absorption is the basis for the use of PCMs to moderate thermal variations in chemical reactions, electronics packing and the like. Thus, in many applications it is advantageous not to fully melt the PCM.

The molten PCM freezes upon removing the thermal body exposure, and exposing the container with the PCM to an environment at a temperature less than the melting temperature of the PCM. The energy absorbed in the process of the PCM melting is now reversibly radiated into the environment. Sensible heat storage within a PCM may be made comparable to that stored in the PCM as latent heat of fusion, but at the cost of not being stored isothermally. Furthermore, excessive heating of the molten PCM in order to store increasing amounts of sensible heat may degrade the PCM. For these reasons, it is a preferred embodiment that the maximal temperature of a PCM not be raised to beyond a point where the sensible heat storage in the liquid PCM is greater than twice that stored as latent heat of fusion.

The process of exposing the PCM container to a thermal source then releasing the energy absorbed into an environment is a reversible process in the instant invention and may be cycled repeatedly.

The container in which the PCM is stored need not be hermetically sealed since the acids present in the instant invention are largely immiscible with water vapor, as would be found in atmospheric air. Immiscible is defined as forming a meniscus between the acid and water upon layering one upon the other. Because it is not required that atmospheric air be excluded from the PCM a variety of substances are adapted for containing the PCMs of the instant invention. These materials illustratively include: metal, plastic, ceramic, siliceous, cellulosic, natural fiber, artificial fiber, concrete, gypsum, rock and mixtures thereof.

It is understood that additional components other than those disclosed herein may be used in conjunction with PCMs comprising mixtures of carboxylic acids, in order to improve or modify PCM properties without departing from the spirit of the invention.

The following examples disclose specific, illustrative PCM compositions of the present invention, which are not intended to limit the scope of the invention.

Example 1

A 125 ml Erlenmeyer flask is tared and a known weight of azelaic acid is added. The flask is closed with a vented rubber stopper and placed in an oven operating at 130° C. until the acid has completely melted. Pure azelaic acid melts at 107° C. The sample flask is then removed from the oven and a glass capillary sheathed K-type thermocouple is placed in the center of the molten solution. The thermal profile is recorded while the approximately 100 g sample of acid is allowed to freeze quiescently in an ambient temperature bath. Upon cooling to ambient temperature the thermal cycle is repeated to assure reproducibility. The experiment is repeated, systematically varying the amounts of a second component, benzoic acid until the full composition range, from 0 to 100 wt. % azelaic acid has been examined. Pure benzoic acid melts at 122° C. A eutectic with a melting temperature of about 80° C. is observed at a composition of about 61 weight percent azelaic acid and about 39 percent benzoic acid. Percentages are based on the total sample weight. Due to the low curvature in the liquidus near the eutectic, compositions considerably removed from the eutectic show thermal plateaus characteristic of commercial PCMs. A borosilicate glass container enclosing the PCM is used to absorb heat from a 170° C. combustion engine exhaust waste stream. Upon turning off the engine, the PCM maintained the temperature of the exhaust stream conduit at 80° C. for several hours. The engine is then restarted and the process repeated.

Example 2

The dibasic acid, undecanedioic acid, $HOOC(CH_2)_9COOH$ is combined in percentages ranging from 0 to 100 wt. % with the monobasic acid, benzoic acid. Using approximately 10 g samples, the time-temperature freezing curve profiles of these samples were studied using the methods of Example 1. A eutectic with a melting temperature of about 77° C. is observed at a composition of about 59 weight percent undecanedioic acid and about 41 weight percent benzoic acid. A borosilicate glass container enclosing the PCM with a melting temperature of 78° C. is used to absorb heat from a volume of 100° C. steam condensate. The steam condensate temperature decreased to 90° C. through exposure to the PCM. The PCM then is discharged in room air. The PCM is then returned to a new volume of steam condensate and the process repeated.

Example 3

The dibasic acid, adipic acid is combined in percentages ranging from 0 to 100 percent with the monobasic acid, benzoic acid. Using approximately 100 g samples, the time-temperature freezing curve profiles of these samples were studied using the methods of Example 1. A dystectic is observed at about a 1:2 stoichiometric ratio of adipic acid to benzoic acid, which is about 37.5 weight percent adipic acid. Eutectics are observed at about 30 and about 38 weight percent adipic acid, with a melting temperature of about 103° C. A stainless steel container enclosing the PCM with a melting temperature of 103° C. is used to absorb heat from a 170° C. combustion engine exhaust waste stream. Upon removal from the waste stream, the PCM is utilized to preheat the fuel mixture entering the engine.

Example 4

Benzoic acid, a monobasic acid is combined in percentages ranging from 0 to 100 wt. % of total sample weight, with a mixture of dibasic acids composed of 80.5 percent azelaic acid, 6.6 percent undecandioic acid, 3.8 percent suberic acid, 2.6 percent sebacic acid, 2.0 percent pimelic acid, 1.2 percent adipic acid, and 0.5 percent dodecandioic acid, in addition to about one percent pelagonic acid. Using approximately 100 g samples, the time-temperature freezing curve profiles of these samples were studied using the methods of Example 1. A dystectic is observed at about 39.5 weight percent benzoic acid with a melting temperature of about 67° C. Eutectics were observed at about 32 and about 44 weight percent benzoic acid, with melting temperatures of about 66.5° C. and about 66.1° C., respectively. A polycarbonate container enclosing the PCM with a melting temperature of 69° C. is used to absorb microwave energy from a Klystron tube. Upon removal from the tube emission, the PCM maintains its melting temperature for several hours in room air.

Example 5

The dibasic acids, glutaric acid and sebacic acid were combined in percentages ranging from 0 to 100 wt. % glutaric acid, based on total sample weight. Using approximately 100 g samples, the time-temperature freezing curve profiles of these samples were studied using the methods of Example 1. A eutectic with a melting temperature of about 80° C. is observed at a composition of about 75 weight percent glutaric acid, based on total sample weight. Due to the low curvature in the liquidus near the eutectic, compositions considerably removed from the eutectic show thermal plateaus characteristic of commercial PCMs. A borosilicate glass container enclosing the PCM with a melting temperature of 84° C. is used to absorb heat from a volume of 100° C. steam condensate. The steam condensate temperature decreased to 91° C. through exposure to the PCM. The PCM is discharged in room air. The PCM is then returned to a new volume of steam condensate and the process repeated.

Example 6

The dibasic acid, pimelic acid is combined in percentages ranging from 0 to 100 wt. % with the monobasic acid, palmitic acid. Using approximately 100 g samples, the time-temperature freezing curve profiles of these samples were studied using the methods of Example 1. A eutectic is observed at about 12 weight percent pimelic acid, having a melting temperature of about 55° C. A dystectic is observed at about 75 weight percent pimelic acid, with resulting eutectics observed at about 70 and about 80 weight percent pimelic acid, with a melting temperature for both eutectics of about 97° C. A polycarbonate container enclosing the PCM with a melting temperature of 56° C. is used to absorb microwave energy from a Klystron tube. Upon removal from the tube emission, the PCM maintained its melting temperature for several hours in room air.

What is claimed is:

1. A process for controlling the temperature of a body, comprising the steps of:
   (a) providing a closed container containing a phase change material comprising
      (i) a mixture of miscible high molecular weight dibasic carboxylic acids, the relative proportions of said dibasic carboxylic acids being such that the melting temperature of the mixture is lower than that of the highest melting temperature of any of the individual high molecular weight dibasic carboxylic acids present and is at or near a eutectic melting temperature in the phase diagram for said mixture, or
      (ii) a mixture of at least one high molecular weight dibasic carboxylic acid and at least one miscible monobasic carboxylic acid, the relative proportions of said dibasic acid(s) and monobasic acid(s) being such that the melting temperature of the mixture is lower than that of the highest melting temperature of any of the individual high molecular weight dibasic carboxylic acids present and is at or near a eutectic melting temperature in the phase diagram for said mixture, the monobasic carboxylic acid being selected from the group consisting of
         (1) alkyl acids of the form R-COOH where R is alkyl or alkenyl containing more than 7 carbon atoms or cyclohexyl;
         (2) substituted phenyl compounds of the form

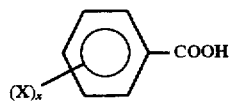

wherein Y=H, benzoyl, benzyl, alkyl containing less than 5 carbon atoms, chloro, amino, hydroxy, methoxy, ethoxy, propoxy, isopropoxy or butoxy and x is an integer between one and 5 inclusive; and
         (3) alpha-naphthoic or β-naphthoic acids,
      wherein said phase change material is at a temperature equal to or below the melting temperature of the phase change material
   (b) contacting said closed container with a body having a temperature above the melting temperature of said phase change material;
   (c) allowing said body to remain in contact with said closed container under conditions such that heat is transferred to said phase change material from said body at least until said phase change material undergoes a reversible melt.
   (d) then exposing said closed container to an environment at a temperature below the melting temperature of the phase change material source such that heat is transferred to said environment, the temperature of said phase change material to decreased to below said melting temperature and said phase change material undergoes a reversible freeze.

2. The process of claim 1 wherein phase change material is a mixture of two or more members selected from the group consisting of glutaric, adipic, pimelic, suberic, azelaic, sebacic, maleic, fumaric, phthalic and isophthalic acids.

3. The process of claim 1 wherein said phase change material is a mixture of adipic acid and azelaic acid.

4. The process of claim 1 wherein said phase change material is a mixture of adipic acid and glutaric acid.

5. The process of claim 1 wherein said phase change material is a mixture of adipic acid and benzoic acid.

6. The process of claim 1 wherein said phase change material is a mixture of adipic acid, benzoic acid, and isophthalic acid.

7. The process of claim 1 wherein said phase change material is a mixture of adipic acid and palmitic acid.

8. The process of claim 1 wherein said phase change material is a mixture of adipic acid and stearic acid.

9. The process of claim 1 wherein said phase change material is a mixture of azelaic acid and benzoic acid.

10. The process of claim 1 wherein said phase change material is a mixture of azelaic acid and palmitic acid.

11. The process of claim 1 wherein said phase change material is a mixture of azelaic acid and stearic acid.

12. The process of claim 1 wherein said body is a heat transfer fluid or air.

13. The process of claim 1 wherein said phase change material is a mixture of miscible high molecular weight dibasic carboxylic acids, the relative proportions of said dibasic carboxylic acids being such that the melting temperature of the mixture is lower than that of the highest melting temperature of any of the individual high molecular weight dibasic carboxylic acids present and is at or near a eutectic melting temperature in the phase diagram for said mixture.

14. The process of claim 1 wherein said phase change material is a mixture of at least one high molecular weight dibasic carboxylic acid and at least one miscible monobasic carboxylic acid, the relative proportions of said dibasic acid(s) and monobasic acid(s) being such that the melting temperature of the mixture is lower than that of the highest melting temperature of any of the individual high molecular weight dibasic carboxylic acids present and is at or near a eutectic melting temperature in the phase diagram for said mixture, the monobasic carboxylic acid being selected from the group consisting of
   (1) alkyl acids of the form R-COOH where R is alkyl or alkenyl containing more than 7 carbon atoms or cyclohexyl;
   (2) substituted phenyl compounds of the form

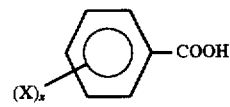

wherein Y=H, benzoyl, benzyl, alkyl containing less than 5 carbon atoms, chloro, amino, hydroxy, methoxy, ethoxy, propoxy, isopropoxy or butoxy and x is an integer between one and 5 inclusive; and
   (3) alpha-naphthoic or β-naphthoic acids.

15. A process for controlling the temperature of a body, comprising the steps of:
   (a) providing a closed container containing a phase change material comprising (i) a mixture of miscible high molecular weight dibasic carboxylic acids, the relative proportions of said dibasic carboxylic acids being such that the melting temperature of the mixture is lower than that of the highest melting temperature of any of the individual high molecular weight dibasic carboxylic acids present and is at or near a eutectic melting temperature in the phase diagram for said mixtures, or (iii) a mixture of at least one high molecular weight dibasic carboxylic acid and at least one miscible monobasic carboxylic acid, the relative proportions of sail dibasic acid(s) and monobasic acid(s) being such that the melting temperature of the mixture is lower than that of the highest melting temperature of any of the individual high molecular weight dibasic carboxylic acids present and is at or near a eutectic melting temperature in the phase diagram for said mixture, the monobasic carboxylic acid being selected from the group consisting of (1) alkyl acids of the form R-COOH where R is alkyl or alkenyl containing more than 7 carbon atoms or cyclohexyl;

(2) substituted phenyl compounds of the form

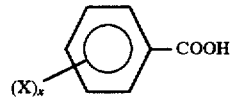

wherein Y=H, benzoyl, benzyl, alkyl containing less than 5 carbon atoms, chloro, amino, hydroxy, methoxy, ethoxy, propoxy, isopropoxy or butoxy and x is an integer between one and 5 inclusive; and (3) alpha-naphthoic or β-naphthoic acids wherein said phase change material is at a temperature equal to or above the melting temperature of the phase change material (b) contacting said closed container with a body having a temperature below the melting temperature of said phase change material;

(c) allowing said body to remain in contact with said closed container under conditions such that heat is transferred from said phase change material to said body at least until said phase change material undergoes a reversible freeze, (d) then exposing said closed container to a heat source such that heat is transferred from said heat source to said phase change material and said phase change material undergoes a reversible melt.

16. The process of claim 15 wherein said phase change material is a mixture of two or more members selected from the group consisting of glutaric, adipic, pimelic, suberic, azelaic, sebacic, maleic, fumaric, phthalic and isophthalic acids.

17. The process of claim 15 wherein said phase change material is a mixture of adipic acid and azelaic acid.

18. The process of claim 15 wherein said phase change material is a mixture of adipic acid and glutaric acid.

19. The process of claim 15 wherein said phase change material is a mixture of adipic acid and benzoic acid.

20. The process of claim 15 wherein said phase change material is a mixture of adipic acid, benzoic acid and isophthalic acid.

21. The process of claim 15 wherein said phase change material is a mixture of adipic acid and palmitic acid.

22. The process of claim 15 wherein said phase change material is a mixture of adipic acid and stearic acid.

23. The process of claim 15 wherein said phase change material is a mixture of azelaic acid and benzoic acid.

24. The process of claim 15 wherein said phase change material is a mixture of azelaic acid and palmitic acid.

25. The process of claim 15 wherein said phase change material is a mixture of azelaic acid and stearic acid.

26. The process of claim 15 wherein, prior to step (a), said phase change material is heated to a temperature equal to or above its melting temperature by absorbing energy from an energy source selected from the group consisting of an exothermic chemical reaction, electrical resistive heating, solar radiation and microwave radiation.

* * * * *